May 1, 1962 R. R. DAHL ET AL 3,031,858
ANALOG THERMOSTAT
Filed March 23, 1959 2 Sheets-Sheet 1

INVENTORS
ROBERT R. DAHL
DONALD E. MILLER
BY
ATTORNEYS

United States Patent Office 3,031,858
Patented May 1, 1962

3,031,858
ANALOG THERMOSTAT
Robert R. Dahl, Lincolnwood, and Donald E. Miller, Mount Prospect, Ill., assignors to The Dole Valve Company, Morton Grove, Ill., a corporation of Illinois
Filed Mar. 23, 1959, Ser. No. 801,087
4 Claims. (Cl. 62—132)

This invention relates to improvements in methods and apparatus for measuring temperature.

In measuring temperature and instigating an operation in accordance with the freezing of a liquid, instead of measuring the temperature of the liquid directly through contact with the liquid, it is frequently desirable to estimate the temperature by measuring the temperature of another liquid having characteristics similar to the characteristics of the liquid being measured and experiencing a similar variation of temperature with time.

The liquid whose temperature is measured may be contained in a chamber which is an integral part of the thermostat assembly, as shown and described in an application Serial No. 769,871, filed October 27, 1958, by Thomas B. Chace and entitled "Thermally Responsive Actuator."

In such theromstats and particularly thermostats which measure the temperature of freezing water and are used to initiate a cycle, such as a cycle of removing frozen ice cubes from an ice tray, the ice cube ejecting cycle must be initiated shortly after the freezing of cubes in the ice tray has been completed.

Since ice cube freezing time is effected primarily by ambient temperature and air circulation in the vicinity of the tray, the thermostat must respond to variations in these factors in the same manner as the ice tray and its contents.

It has further been found that with a thermostat measuring the temperature of a body which is an integral part of the thermostat assembly, and where the body is water or any other type of freezable liquid, that during freezing of the liquid and shortly before the liquid is frozen, the temperature of the liquid will drop in the range of from approximately 22° F. to 26° F. The liquid will then warm up to 32° and freeze. This drop in temperature prior to freezing is commonly called undercooling or supercooling, and where the body being measured is an integral part of the thermostat assembly and is estimating the temperature of freezing water, during the period of supercooling, the thermostat will come into operation and instigate the ice removing or making cycle prior to the freezing of water in the ice tray.

A principal object of the invention is, therefore, to provide a novel form of thermostat estimating the freezing of water into ice by measuring the temperature of another liquid in heat sensing relation with respect to the temperature sensitive element of the thermostat in which freezing of the other liquid is propagated, to inhibit supercooling of the other liquid and thereby prevent operation of the thermostat prior to freezing of the freezing water.

A further object of the invention is to provide a novel form of thermal actuator in which operation of the actuator is parallel to the freezing of water.

A still further object of the invention is to provide a thermally responsive device in which a liquid is self-contained as an integral part of a theromstat assembly, and in which a simple means is provided for seeding the liquid with ice crystals prior to freezing thereof, to propagate freezing of the liquid and thereby prevent operation of the thermally responsive device prior to freezing of the liquid.

A further object of the invention is to provide a thermally responsive actuator including a casing containing a thermally responsive material in which a freezable liquid surrounds the casing, and in which freezing of the freezable liquid is propagated and supercooling of the freezable liquid is inhibited by providing a tube in the ambient temperature of the evaporator compartment of a refrigerator having communication with the liquid whose temperature is being measured, whereby the frozen liquid in the tube seeds the liquid whose temperature is measured with ice crystals prior to freezing thereof.

These and other objects of the invention will appear from time to time as the following specification proceeds and with reference to the accompanying drawings wherein.

Figure 1:
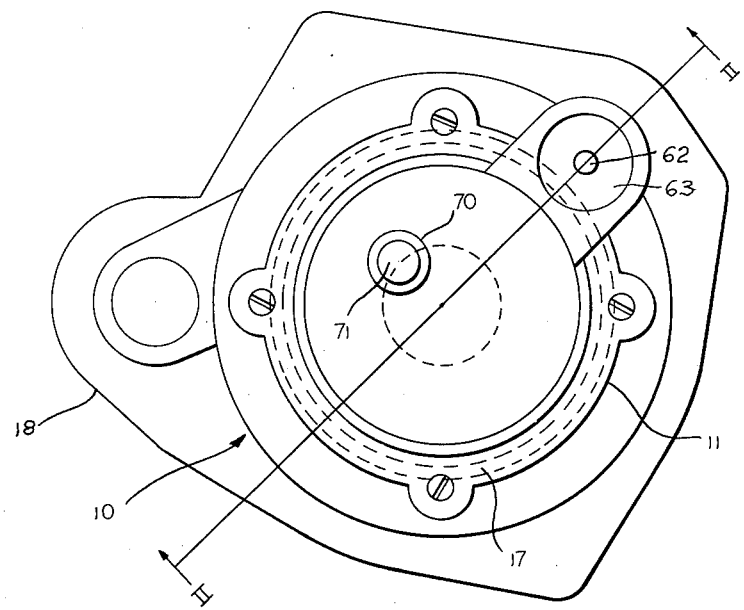
FIGURE 1 is an end view of a thermally responsive device constructed in accordance with the invention.
Figure 4:
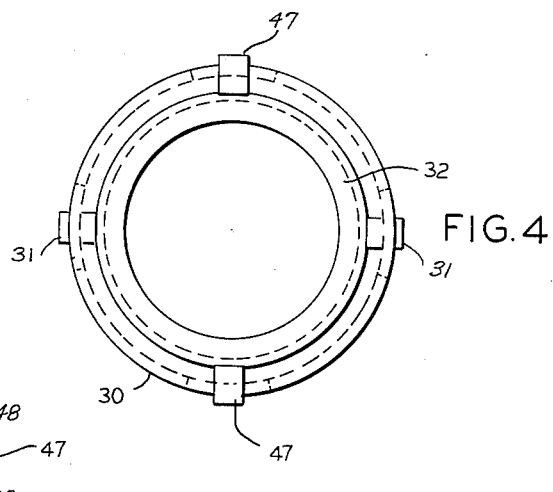
FIGURE 4 is a detail view illustrating certain details of the cage for certain parts of the device.
Figure 5:
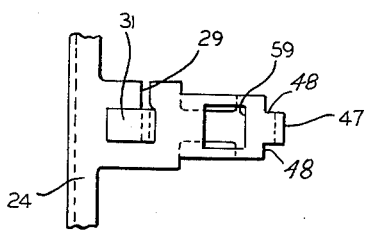
FIGURE 5 is a detail view in side elevation of the cage shown in FIGURE 4, illustrating certain details of construction of the cage not shown in FIGURE 4.

In the embodiment of the invention illustrated in the drawings, we have shown a thermally responsive actuator 10 of a type particularly adapted to control the carrying out of the ice making and ice removing cycles of an automatic ice maker and the like. The thermally responsive actuator 10 is shown as including a generally cylindrical housing 11 having a reduced diameter open end portion 12 forming a means of access to a plurality of terminals 13, 14 and 15, which may be connected to control operation of an ice maker and the like (not shown) by operation of a switch 16 of the thermally responsive actuator as will hereinafter more clearly appear as the specification proceeds. The reduced diameter cylindrical portion 12 has an attachment flange 18 extending thereabout. The opposite end of the housing 11 from the attachment flange 18 is shown as being closed by an end cap or cover 17 detachably secured thereto as by machine screws or the like.

Within the housing 11 is a thermally responsive element 19 of a type similar to that shown and described in Patent No. 2,368,181, which issued to Sergius Vernet on January 30, 1945, and of the so-called power or high motion solid fill type of thermally responsive element. In such thermally responsive elements, a fusible thermally expansible material within a casing 20, acts against a flexible membrane or diaphragm (not shown) to extensibly move a power member or piston 21 from a cylinder 23 of the thermal responsive element, upon fusion of the thermally expansible material and forming the actuator for the thermostat, instigating a work operation, such as an ice cube ejecting operation, upon the freezing of the water in the evaporator of the refrigerator into ice pieces. The thermally expansible material may be a wax, or a wax and a powdered metal heat conductor and a binder, the particular material used being selected for the desired temperature range of operation of the thermally responsive element and the required sensitiveness to changes in temperature.

Figure 2:
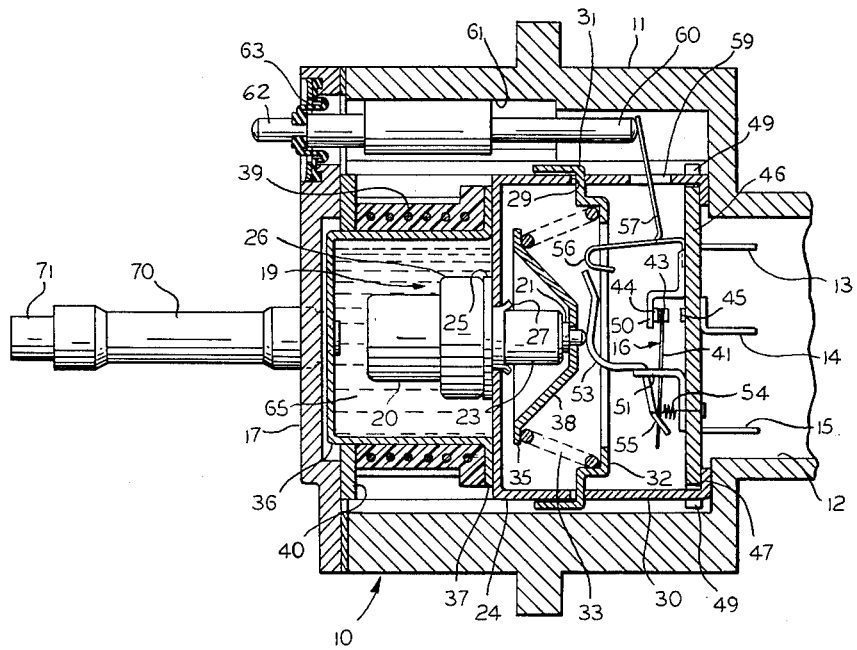
FIGURE 2 is a fragmentary sectional view taken substantially along line II—II of FIGURE 1.

The thermally responsive element 19 is shown in FIGURE 2 as being mounted in the bottom of a cage 24 forming a support for the switch 16. As herein shown, a washer 25 is interposed between a clamping ring 26, clamping the cylinder 23 to the casing 20, and the bottom of the cage 24. The cylinder 23 extends through the bottom of the cage 24 and is shown in FIGURE 2 as being staked thereto as indicated by reference character 27.

The cage 24 is shown as having a plurality of diametrically opposed slots 29 extending though spaced upwardly extending arms 30 thereof, through which fit tangs 31 extending outwardly of an annular spring retainer 32. The tangs 31 are shown as being bent about the outer margins of the arms 30 to extend in generally parallel relation with respect thereto, and to lock the spring retainer 32 to the cage 24.

The spring retainer 32 forms a seat for a return spring 33 for the power member or piston 21 of the thermally responsive element. The return spring 33 is shown as being a conical spring, seated at one end in the retainer 32 and seated at its opposite end on a flange 35 of a saddle 38, mounted on the piston 21 and extending outwardly and angularly inwardly therefrom towards the bottom of the cage 24.

The casing 20 of the thermally responsive element 19 is enclosed by a generally cylindrical container 36, spaced from said casing in radial and axial directions, and having an annular flange 37 extending laterally from the inner margin thereof, abutting the bottom of the cage 24 and suitably secured thereto, in water tight relation with respect thereto.

The container 36 is encircled by a resistor heater 39, abutting the flange 37 at one end and abutting an abutment washer 40 at its opposite end. The abutment washer 40 abuts the inside of the end cap or cover 17. The resistor heater 39 may be of any well known form and serves to reset the thermostat, by heating the thermally responsive element to effect extensible movement of the power member 21.

The switch 16 is herein shown as being a two position switch having a switch arm 41 having a contact 43 on the end thereof, engageable with either of two axially spaced contacts 44 and 45 on the terminals 13 and 14 respectively.

The terminals 13, 14 and 15 are suitably mounted in an insulator plate 46 extending across the cage 24 and abutting flanges 47 extending inwardly of the outer margins of the arms 30. The insulator plate 46 has spaced ears 49 extending from opposite sides thereof extending along shouldered portions 48 of the arms 30.

The contact 44 is mounted on an inner end portion 50 of the terminal 13, which inner end portion is spaced inwardly of the inner side of the insulator plate 46, and extends generally parallel thereto. The switch arm 41 extends through the slot (not shown) of a slotted leg 51. The slotted leg 51 is shown in FIGURE 2 as being a part of the terminal 15 and spaced inwardly therefrom and extending at right angles to the inner side of the insulator plate 46.

The slotted leg 51 also has an over-center lever 53 rockingly mounted therein. The over-center lever 53 abuts the end of the piston or power member 21 and is rocked thereby in one direction upon extensible movement of said piston. A tension spring 54, connected between the outer end portion of an arm 55 of the over-center lever 53 and the insulator plate 46, is provided to bias the over-center arm 53 into engagement with the end of the piston 21. The switch arm 41 extends through a slotted portion (not shown) of the arm 55, to be moved by said arm out of engagement with the contact 44 into engagement with the contact 45 as the piston 21 is extended from the cylinder 23, upon certain increases in temperature, and to be moved out of engagement with the contact 45 into engagement with the contact 44, as the piston 21 is retractibly moved within the cylinder 23 upon certain reductions in temperature, such as the freezing of water and the like.

A resilient catch 56 is provided for the over-center lever 53, to engage the end of said lever opposite the spring 54 upon retractible movement of the piston 21 to prevent engagement of the contact 43 with the contact 44 under certain conditions of operation, as for example, where the thermally responsive actuator may be used for an ice maker and the storage tray for the ice cubes may be full.

The resilient catch 56 is suitably mounted on the inside of the insulator plate 46 and extends generally axially inwardly therefrom and may be made from Phosphor bronze, a spring steel, or any other suitable resilient metal. As herein shown, the resilient catch 56 has an integrally formed arm 57 extending outwardly therefrom through a slot 59 in the wall 30 of the casing 24 and into position to be engaged by the end of a plunger 60. The plunger 60 is slidably guided for movement along a generally cylindrical guide 61 formed within the housing 11 and has a reduced outer end portion 62 extending outwardly through the cover or end cap 17 and sealed thereto by an annular diaphragm 63. The reduced end portion of the plunger 60 may be engaged by a cam (not shown) or the like operated by an over-fill arm (not shown) of an ice maker and controlling the level of ice cubes in the storage basket for the ice maker.

Thus, during each cycle of operation of the ice maker as the ice cubes are discharged from the ice cube tray (not shown) into the storage basket, the over-fill arm (not shown) may be lifted to depress the plunger 60 and move the resilient catch 56 to release the end of the over-center arm 53 and accommodate the contact 43 to engage the contact 44. When, however, the ice cube storage tray is filled with ice cubes, the over-fill arm (not shown) will remain in an elevated position and the resilient catch 56 will be in position to engage the end of the over-center lever 53, to prevent engagement of the contact 43 with the contact 44, to initiate a next successive cycle of operation of the thermally responsive actuator.

Figure 3:
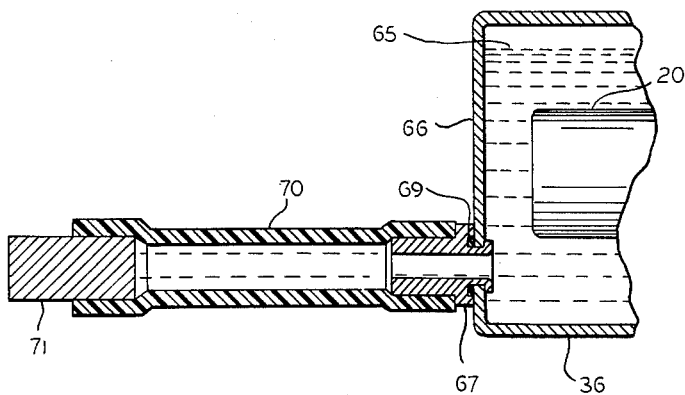
FIGURE 3 is an enlarged partial fragmentary sectional view illustrating the device for seeding the temperature measuring liquid with ice crystals.

Referring now in particular to the means for causing operation of the piston 21 in a retractible direction parallel to the freezing of water, the container 36 is spaced from the casing 20 and clamping ring 24 and the inside thereof with the casing 20, forms an annular chamber 65 filled with water or a like freezable material, or a mixture of water with one of the known chemicals, giving the water properties having similar variations of temperature with time as the body, the temperature of which is to be estimated, such as the water in an ice cube tray and the like. A bottom 66 of the container 36 has a fitting 67 mounted therein and sealed thereto as by a seal 69, and accommodating the liquid within the chamber 65 to flow therethrough. As herein shown, a tube 70 of low heat conductivity is mounted on the fitting 69 and extends therefrom. The tube 70 is shown as being closed at its outer end by a plug 71, which may be of high heat conductivity and which may be in the evaporator compartment of the refrigerator in the region of the ice cube tray, in instances where the thermally responsive actuator is used to control operation of an ice maker. The tube 70 is shown in FIGURE 3 as being made of plastic, but may be made of stainless steel or of any metal having a relatively low heat conductivity, compared to the heat conductivity of the plug 71. The plug 71 may be made of brass or aluminum or of any other metal having a relatively high heat conductivity.

In operation of the device, and during cooling and freezing of the water in the ice tray, the water in the chamber 65 and tube 70 also cools and freezes. After the water in the chamber 65 has frozen, it is allowed to cool further. As the frozen water cools in the temperature range of from 32° to 20° F., the piston 21 will remain stationary while ice is being formed at 32° F. and will then undergo further retraction, but at a much higher rate as the ice in the chamber 65 cools in the range of 32° to 20° F. The switch arm 41 of the switch 16 will then trip at a temperature in the range of 22° to 26° F. and effect engagement of the contact 43 on the switch arm 41 with the stationary contact 44. This will instigate an ice removing cycle. The resistor heater 39 may then be energized to melt the water in the chamber 65 and heat the casing 20 to effect extensible movement of the piston 20 and effect engagement of the contact 43 with the contact 45. As the ice in the chamber 65 melts, the plug 71 of high heat conductivity in the evaporator compartment of the refrigerator will maintain ice crystals in the tube 70.

It has been found that as long as there is continuity between water in the chamber 65 and the tube 70, and the tube is so designed and positioned that all of the liquid in it becomes frozen by the time the water in the chamber has cooled to its freezing temperature, that the ice crystals in the tube 70 will seed the water in the chamber 65 and inhibit supercooling of the water in said chamber, and will thus prevent premature engagement of the contact 43 with the contact 44.

It may be seen from the foregoing that the accuracy and effectiveness of the thermally responsive actuator is enhanced by estimating the temperature of the water in an ice cube tray and the like, by measuring the temperature of a body of water which is an integral part of the thermostat assembly, and by inhibiting the supercooling of the body of water measured.

It may further be seen that the inhibiting of the supercooling of the body of water measured is by the simple method of seeding the body of water with ice crystals during and prior to freezing thereof, by maintaining ice crystals in the tube 70 around the inner end of the plug 71 when the water in the chamber 65 and tube 70 is melted.

While we have herein shown and described one form in which our invention may be embodied, it will be understood that various modifications and variations in the invention may be effected, without departing from the spirit and scope of the novel concepts of the invention, as defined by the claims appended hereto.

We claim as our invention:

1. In a thermally responsive device adapted for use in the evaporator compartment of a refrigerator for controlling the freezing of water in the evaporator compartment into ice, a casing containing a thermally responsive material, an actuator extensibly movable with respect to said casing upon increases in temperature and retractibly movable with respect to said casing upon decreases in temperature, a freezable liquid chemically different from said thermal responsive material surrounding said casing, container means containing the freezable liquid exterior of and about said casing, the freezable liquid controlling expansion and contraction of the thermally responsive material in accordance with the freezing of ice in the evaporator of the refrigerator, and means propagating the crystallization of the freezable liquid and causing retractible movement of said actuator in parallel with the freezing of ice in the evaporator of the refrigerator comprising means in communication with said container means and storing ice crystals upon melting of the freezable liquid in said container means and seeding the freezable liquid in said container means with ice crystals during freezing thereof.

2. In a thermally responsive device adapted for use in the evaporator compartment of a refrigerator for controlling the freezing of water in the evaporator compartment into ice, a casing containing a thermally responsive material, an actuator extensibly movable with respect to said casing upon increases in temperature to reset the thermally responsive device and retractibly movable with respect to said casing upon decreases in temperature to effect a work operation, a freezable liquid exterior to and surrounding said casing, said freezable liquid being different chemically from said thermal responsive material, container means containing the freezable liquid about said casing and remote from the water in the evaporator of the refrigerator, the freezable liquid controlling expansion and contraction of the thermally responsive material in accordance with the freezing of ice in the evaporator of the refrigerator, and means propagating the crystallization of the freezable liquid and causing retractible movement of said actuator in parallel with the freezing of water in the evaporator of the refrigerator comprising a tube leading from said container means and storing ice crystals upon the melting of the freezable liquid and seeding the freezable liquid with ice crystals upon a freezing cycle of ice in the evaporator of the refrigerator.

3. In a thermally responsive device adapted for use in the evaporator compartment of a refrigerator for controlling the freezing of water in the evaporator compartment into ice, a casing containing a thermally responsive material, an actuator extensibly movable with respect to said casing upon increases in temperature to reset the thermally responsive device and retractibly movable with respect to said casing upon decreases in temperature to effect a work operation, a freezable liquid surrounding said casing and different chemically from the thermally responsive material, container means containing the freezable liquid about said casing and remote from the water in the evaporator of the refrigerator, the freezable liquid controlling expansion and contraction of the thermally responsive material in accordance with the freezing of ice in the evaporator of the refrigerator, and means propagating the crystallization of the freezable liquid and causing retractible movement of said actuator in parallel with the freezing of water in the evaporator of the refrigerator comprising a tube of low heat conductivity leading from said container means and having communication with the freezable liquid therein, and a closure of high heat conductivity closing the end of said tube and maintaining ice crystals within said tube adjacent said closure as the freezable liquid within said container means melts, and seeding the freezable liquid with ice crystals during freezing thereof by communication with the ice crystals with the freezable liquid in said container means.

4. In a thermally responsive device adapted for use in the evaporator compartment of a refrigerator for controlling the freezing of water in the evaporator compartment into ice, a casing containing a thermally responsive material, a freezable liquid exterior to and surrounding said casing and different chemically from the thermally responsive material, container means containing the freezable liquid about said casing, an actuator extensibly movable with respect to said casing upon increases in temperature to reset the thermally responsive device and retractibly movable upon increases in temperature to effect a work operation, a resistor heater encircling said casing for melting the freezable liquid to effect resetting of the thermally responsive device, means retractibly moving said actuator upon freezing of the freezable liquid, and means propagating the crystallization of the freezable liquid and causing retractible movement of said actuator in parallel with the freezing of water in the evaporator of the refrigerator, comprising a tube leading from said container means and having direct communication therewith and storing ice crystals upon the melting of the freezable liquid in said container means and seeding the freezable liquid with ice crystals upon a freezing cycle of the freezable liquid in said container means.

References Cited in the file of this patent

UNITED STATES PATENTS

| | | |
|---|---|---|
| 2,115,502 | Vernet | Apr. 26, 1938 |
| 2,135,078 | Hubbard | Nov. 1, 1938 |
| 2,187,258 | Wood | Jan. 16, 1940 |
| 2,512,066 | Linfor | June 20, 1950 |
| 2,724,950 | Rothwell | Nov. 29, 1955 |
| 2,797,546 | Reddi | July 2, 1957 |
| 2,815,642 | Sherwood | Dec. 10, 1957 |